(12) United States Patent
Wolf

(10) Patent No.: US 9,945,067 B1
(45) Date of Patent: Apr. 17, 2018

(54) AIRFOIL APPARATUS FOR A SYSTEM HAVING A CONTROLLED INTERNAL ENVIRONMENT

(71) Applicant: Illinois Tool Works Inc., Glenview, IL (US)

(72) Inventor: Rory A. Wolf, Hartford, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 15/295,304

(22) Filed: Oct. 17, 2016

(51) Int. Cl.
*D06M 10/02* (2006.01)
*D06C 15/00* (2006.01)

(52) U.S. Cl.
CPC .......... *D06M 10/025* (2013.01); *D06C 15/00* (2013.01)

(58) Field of Classification Search
CPC . D06C 7/00; D06C 7/02; D06C 15/00; D06C 15/02; D06C 15/08; D06C 21/00; D06C 17/02; D06C 2700/09; D06C 2700/21; D06M 10/025; D06M 10/02; D06M 10/00; D21F 5/18; D21F 5/188; F26B 11/024; F26B 11/026; F26B 13/005; F26B 13/104; D06B 3/10; D06B 3/20; D06B 23/16; D06B 23/14; D06B 23/18; D06B 23/02
USPC ...... 28/264, 269; 26/18.5, 18.6, 106; 34/641
See application file for complete search history.

(56) References Cited

U.S. PATENT DOCUMENTS

| | | | | |
|---|---|---|---|---|
| 3,316,657 A | * | 5/1967 | Haywood | D21F 1/32 222/637 |
| 3,471,597 A | * | 10/1969 | Schirmer | B26F 1/28 264/483 |
| 4,142,278 A | * | 3/1979 | Walton | D06C 21/00 26/18.6 |
| 4,247,993 A | * | 2/1981 | Lindstrom | D21F 5/188 226/196.1 |
| 4,777,557 A | | 10/1988 | Ahlbrandt | |
| 5,016,329 A | * | 5/1991 | Milligan | D06C 5/00 26/18.5 |
| 5,074,016 A | * | 12/1991 | Meyer | D02G 1/12 28/263 |
| 5,117,540 A | * | 6/1992 | Walton | D06C 21/00 26/18.6 |
| 5,666,703 A | * | 9/1997 | Walton | B31F 1/12 162/11 |

(Continued)

FOREIGN PATENT DOCUMENTS

| | | |
|---|---|---|
| GB | 1045087 | 10/1966 |
| GB | 1071193 | 6/1967 |

OTHER PUBLICATIONS

International Search Report and Written Opinion from corresponding International Patent Application No. PCT/US2017/054387 dated Dec. 13, 2017, 12 pages.

*Primary Examiner* — Amy Vanatta

(74) *Attorney, Agent, or Firm* — Klintworth & Rozenblat IP LLP

(57) ABSTRACT

According to an aspect of the present disclosure, an airfoil apparatus is provided which minimizes entry of entrained air into a system having a controlled internal environment, such as a corona treatment system, such entrained air resulting from a high-speed web moving into the system. According to another aspect of the present disclosure, the airfoil apparatus is rotatable relative to the system so that the airfoil apparatus can be adjusted to changes in the web.

19 Claims, 10 Drawing Sheets

(56) References Cited

U.S. PATENT DOCUMENTS

| | | | | |
|---|---|---|---|---|
| 5,778,502 A | * | 7/1998 | Voigtlander | D02G 1/12 28/263 |
| 5,891,309 A | * | 4/1999 | Page | D21G 9/0063 162/111 |
| 2002/0148584 A1 | * | 10/2002 | Edwards | D21F 3/0218 162/204 |
| 2011/0179610 A1 | * | 7/2011 | Catallo | D06C 21/00 26/18.6 |
| 2017/0185028 A1 | * | 6/2017 | Gilliam | G03G 21/0011 |

\* cited by examiner

AIRFOIL APPARATUS FOR A SYSTEM HAVING A CONTROLLED INTERNAL ENVIRONMENT

FIELD OF THE INVENTION

The present invention relates generally an airfoil apparatus which minimizes entry of entrained air into a system having a controlled internal environment, such as a corona treatment system, such entrained air resulting from a high-speed web moving into the system.

BACKGROUND

Corona treatment is a method using an electrical corona discharge to modify a surface of a web to improve its ability to accept inks and adhesives. In a corona treatment system, a high voltage electrode is mounted parallel to and spaced from a ground roller, which forms a grounded electrode. The air gap between the electrode and the ground roller is energized, forming a corona, which, when web is passed therethrough modifies the material the web is formed of, and makes the web more receptive to ink and adhesives. Corona will be produced anywhere there is air within this air gap.

The web is moving a high speed. As the web enters into the corona treatment system, the web passes through a pair of nip rollers, and may pass through a secondary pair of nip rollers. The web is routed around idler rollers and then through the air gap between the electrode and the ground roller. After the web is treated, the web exits the corona treatment system.

It is desired for the air within the corona treatment system to be kept inert to provide for a better reaction within the air gap. When a web is moving at high speed, the web entrains air in the ambient atmosphere and enters into the corona treatment system through the nip rollers. The air has a tendency to permeate the corona treatment system which may result in an undesirable reaction in the corona treatment system.

SUMMARY

In one aspect, an airfoil apparatus is provided which minimizes entry of entrained air into a system having a controlled internal environment, such as a corona treatment system, such entrained air resulting from a high-speed web moving into the system.

According to another aspect of the present disclosure, the airfoil apparatus is rotatable relative to the system so that the airfoil apparatus can be adjusted to changes in the web.

The scope of the present invention is defined solely by the appended claims and is not affected by the statements within this summary.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

Figure 1:
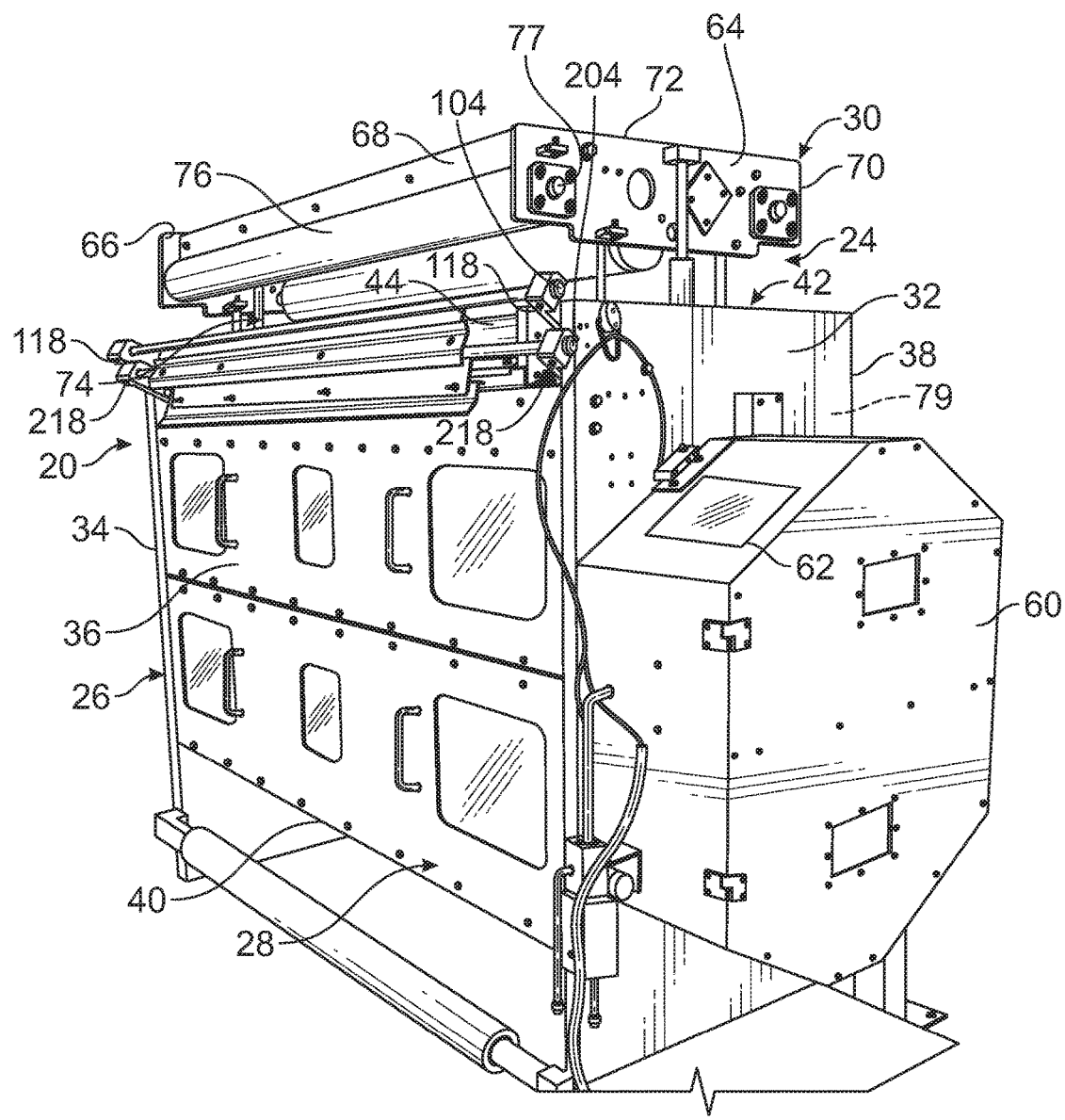
FIG. 1 depicts a perspective view of a system having a controlled internal environment and airfoil apparatus which incorporates features of the present disclosure, with a cover of the system being shown in an open position.
Figure 2:
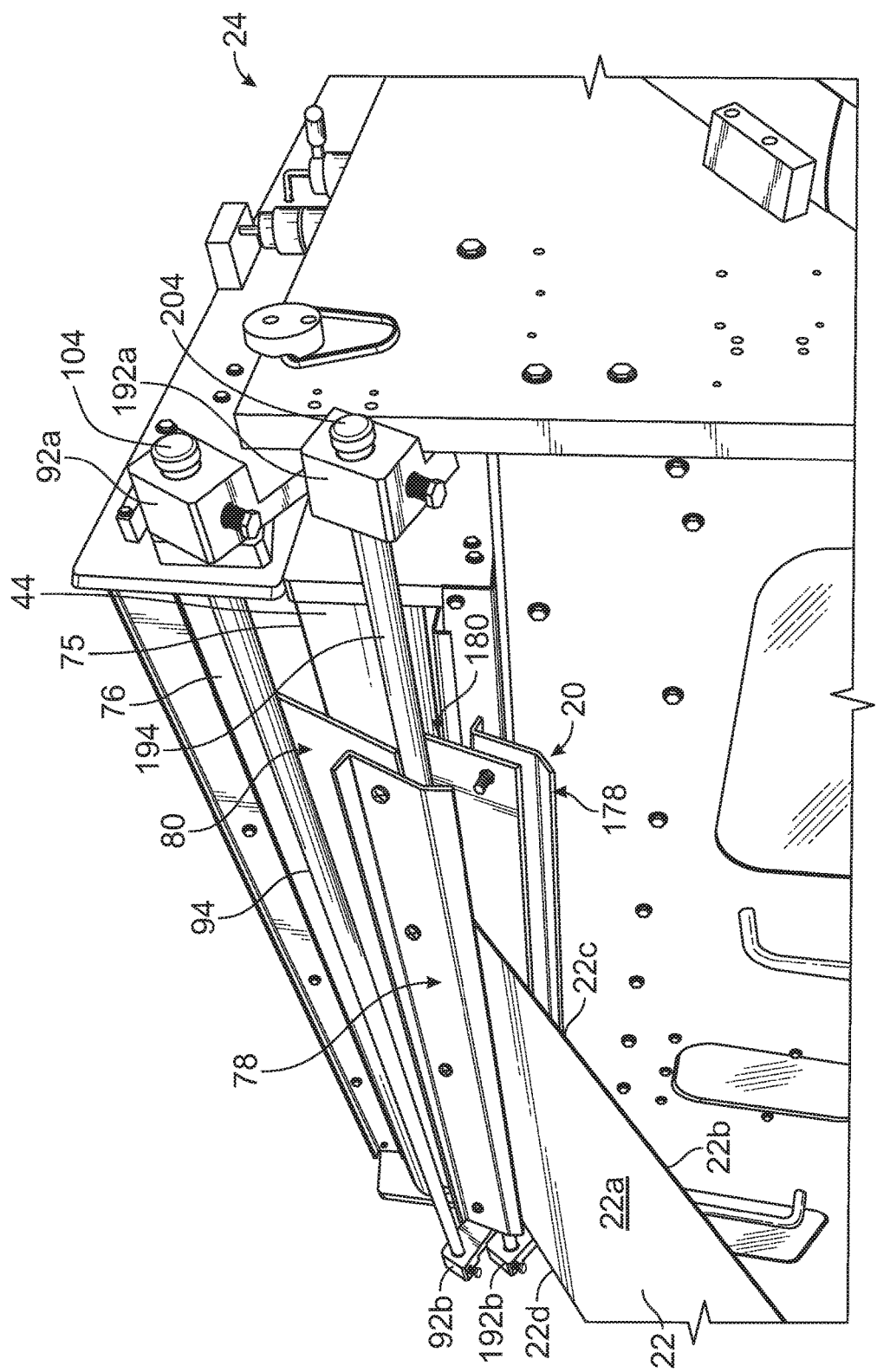
FIG. 2 depicts an enlarged perspective view of the system and airfoil apparatus, with the cover of the system being shown in a closed position.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity.

An airfoil apparatus 20 which minimizes entry of entrained ambient air which results from a high speed flexible web 22 moving into system 24 having a controlled internal environment, such as a corona treatment system, is provided. The airfoil apparatus 20 disrupts the airflow of the entrained air formed by the movement of the high speed web 22 into the system 24, and deflects or substantially deflects the entrained air from entering into the system 24.

The web 22 has an upper surface 22a, a lower surface 22b and opposite side edge 22c, 22d. A thickness of the web 22 is defined between the upper and lower surfaces 22a, 22b. Examples of webs 22 that may be treated by the system 24 include, but are not limited to, paper, polymer films, elastomers, plastics, foams, etc.

The system 24 includes a cabinet 26 which is formed of a base cabinet 28 having a movable cover 30 mounted thereto.

The base cabinet 26 includes a first side wall 34 and, in parallel relationship thereto, a second side wall 36, a front wall 38 and, in parallel relationship thereto, a back wall 40, the front and back walls 38, 40 extending between the side walls 34 36, and a bottom wall 40 which closes the bottom ends of the walls 34, 36, 38, 40. An interior cavity 42 is defined within the base cabinet 26. The top end of the cavity 42 is open.

The base cabinet 26 supports a lower nip roller 44 which is mounted for a rotation on a shaft (not shown) between the side walls 34, 36 and is positioned above the front wall 36. A secondary pair of nip rollers (not shown) may be provided between the side walls 34, 36 at the top ends thereof. The secondary pair of nip rollers are spaced from the lower nip roller 44.

The cover 30 includes a first side wall 64 and, in parallel relationship thereto, a second side wall 66, a front wall 68 and, in parallel relationship thereto, a back wall 70, the front and back walls 68, 70 extending between the side walls 64, 66, and a top wall 72 which closes the upper ends of the walls 64, 66, 68, 70. The cover 30 is attached by a suitable lifting apparatus 74, which is known in the art, to the base cabinet 26 such that the cover 30 can be raised or lowered relative to the base cabinet 26 to expose or cover the cavity 42. The cover 30 supports an upper nip roller 76 which is mounted for a rotation on a shaft 77 between the side walls 64, 66 and is positioned beneath the front wall 68.

When the cover 30 is open, the lower and upper nip rollers 44, 76 are separated from each other and the cavity 42 is open. When the cover 30 is closed, the nip rollers 44, 76 are in close proximity to each other such that a nip 75 is formed between the nip rollers 44, 76 through which the web 22 passes as the web 22 enters into the system 24. A controlled internal environment chamber 79 in which the atmosphere therein can be inerted within the cabinet 26 when the cover 30 is closed. The air within the internal environment chamber 79 is kept inert to improve treatment properties of the web 22.

The airfoil apparatus 20 includes an upper airfoil 78 attached to an upper mount 180 on the base cabinet 28, and a lower airfoil 178 attached to a lower mount 180 on the base cabinet 28. The upper and lower airfoils 78, 178 are cantilevered from the base cabinet 28. The upper airfoil 78 is positioned proximate to the upper nip roller 76 when the cover 30 is closed. The lower airfoil 178 is positioned proximate to the lower nip roller 44. In use, front ends 86a, 186a of the airfoils 78, 178 are proximate to each other, but slightly spaced apart to create a passageway for the passage of the web 22 therebetween. The passageway is slightly larger than the thickness of the web 22. In an embodiment, at least one of the upper and lower airfoils 78, 178 are rotatable relative the base cabinet 28 as described herein. In an embodiment, the upper mount 80 and upper airfoil 78 are provided on the cover 30 and are moveable with the cover 30.

As shown in FIGS. 6-9, the upper airfoil 78 includes a first wall 86, a planar second wall 88 and a third wall 90. The walls 86, 88, 90 may be integrally formed.

The first wall 86 has the front end 86a, a rear end 86b, a first side edge 86c extending between the front end 86a and the rear end 86b, a second side edge 86d extending between the front end 86a and the rear end 86b, an upper surface 86e and a lower surface 86f. In an embodiment, the side edges 86c, 86d are parallel to each other. The upper surface 86e is planar. The front end 86a may be tapered (not shown).

The second wall 88 has a front end 88a, a rear end 88b, a first side edge 88c extending between the front end 88a and the rear end 88b, a second side edge 88d extending between the front end 88a and the rear end 88b, an upper surface 88e and a lower surface 88f. In an embodiment, the side edges 88c, 88d are parallel to each other. The upper and lower surfaces 88e, 88f are planar. The front end 88a of the second wall 88 extends from the rear end 86b of the first wall 86. In an embodiment, the second wall 88 is angled downwardly relative to the first wall 86 at an angle $\alpha$, see FIG. 8, and in an embodiment, the angle $\alpha$ is in the range of 90 degrees to 180 degrees. In an embodiment, the angle $\alpha$ is 130 degrees. In an embodiment, the angle $\alpha$ is 180 degrees such that the first and second walls 86, 88 form a continuous linear surface.

The third wall 90 has a bottom end 90a, a top end 90b, a first side edge 90c extending between the bottom end 90a and the top end 90b, a second side edge 90d extending between the bottom end 90a and the top end 90b, a front surface 90e and a rear surface 90f. In an embodiment, the side edges 90c, 90d are parallel to each other. In an embodiment, the front surface 90e is planar. The bottom end 90a of the third wall 90 extends from the top surface 88e of the second wall 88. In an embodiment, the third wall 90 is positioned proximate to the rear end 88b of the second wall 88. The third wall 90 is angled relative to the second wall 88 at an angle $\beta$, see FIG. 8, and in an embodiment, the angle $\beta$ is in the range of 90 degrees to 180 degrees. In an embodiment, the angle $\beta$ is 90 degrees such that the third wall 90 is perpendicular to the second wall 88.

The first wall 86 and the third wall 90 extend from the second wall 88 in opposite directions.

As shown in FIGS. 10-13, the lower airfoil 178 includes a first wall 186, a planar second wall 188 and a third wall 190. The walls 186, 188, 190 may be integrally formed.

The first wall 186 has the front end 186a, a rear end 186b, a first side edge 186c extending between the front end 186a and the rear end 186b, a second side edge 186d extending between the front end 186a and the rear end 186b, an upper surface 186e and a lower surface 186f. In an embodiment, the side edges 186c, 186d are parallel to each other. The lower surface 186f is planar. The front end 186a may be tapered (not shown).

The second wall 188 has a front end 188a, a rear end 188b, a first side edge 188c extending between the front end 188a and the rear end 188b, a second side edge 188d extending between the front end 188a and the rear end 188b, an upper surface 188e and a lower surface 188f. In an embodiment, the side edges 188c, 188d are parallel to each other. The upper and lower surfaces 188e, 188f are planar. The front end 188a of the second wall 188 extends from the rear end 186b of the first wall 186. The second wall 188 is angled upwardly relative to the first wall 186 at an angle $\gamma$, see FIG. 12, and in an embodiment, the angle $\gamma$ is in the range of 90 degrees to 180 degrees. In an embodiment, the angle $\gamma$ is 130 degrees. In an embodiment, the angle $\gamma$ is 180 degrees such that the first and second walls 86, 88 form a continuous linear surface.

The third wall 190 has a bottom end 190a, a top end 190b, a first side edge 190c extending between the bottom end 190a and the top end 190b, a second side edge 190d extending between the bottom end 190a and the top end 190b, a front surface 190e and a rear surface 190f. In an embodiment, the side edges 190c, 190d are parallel to each other. In an embodiment, the front surface 190e is planar. The top end 190b of the third wall 190 extends from the bottom surface 188d of the second wall 188. In an embodiment, the third wall 190 is positioned proximate to the rear end 188b of the second wall 188. The third wall 190 is angled relative to the second wall 188 at an angle $\Phi$, see FIG. 12, and in an embodiment, the angle $\Phi$ is in the range of 90 degrees to 180 degrees. In an embodiment, the angle $\Phi$ is 90 degrees such that the third wall 190 is perpendicular to the second wall 188.

The first wall 186 and the third wall 190 extend from the second wall 188 in opposite directions.

In an embodiment, the mounts 80, 180 provide a rotatable attachment of the airfoils 78, 178 to the base cabinet 28. In this embodiment, the upper mount 80 includes a pair of spaced apart supports 92a, 92b fixedly attached to the base cabinet 28, a cylindrical rod 94 rotatably attached to the supports 92a, 92b, and a spacer member 96 fixedly attached to the rod 94 and to the upper airfoil 78; the lower mount 180 includes a pair of spaced apart supports 192a, 192b fixedly attached to the base cabinet 28, a cylindrical rod 194 rotatably attached to the supports 192a, 192b, and a spacer member 196 fixedly attached to the rod 194 and to the lower airfoil 178. The upper supports 92a, 92b may be vertically aligned with the lower supports 192a, 192b on the front wall 28 of the base cabinet 26. In an embodiment, the upper rod 94 is positioned proximate to the upper nip roller 76 when the cover 30 is closed. In an embodiment, the upper rod 94 is positioned above the upper nip roller 76 when the cover 30 is closed. In an embodiment, the lower rod 194 is positioned proximate to the lower nip roller 44. In an embodiment, the lower rod 194 is positioned below the lower nip roller 44. The rods 94, 194 extend parallel to the front wall 28 of the cabinet 26.

Figure 4:
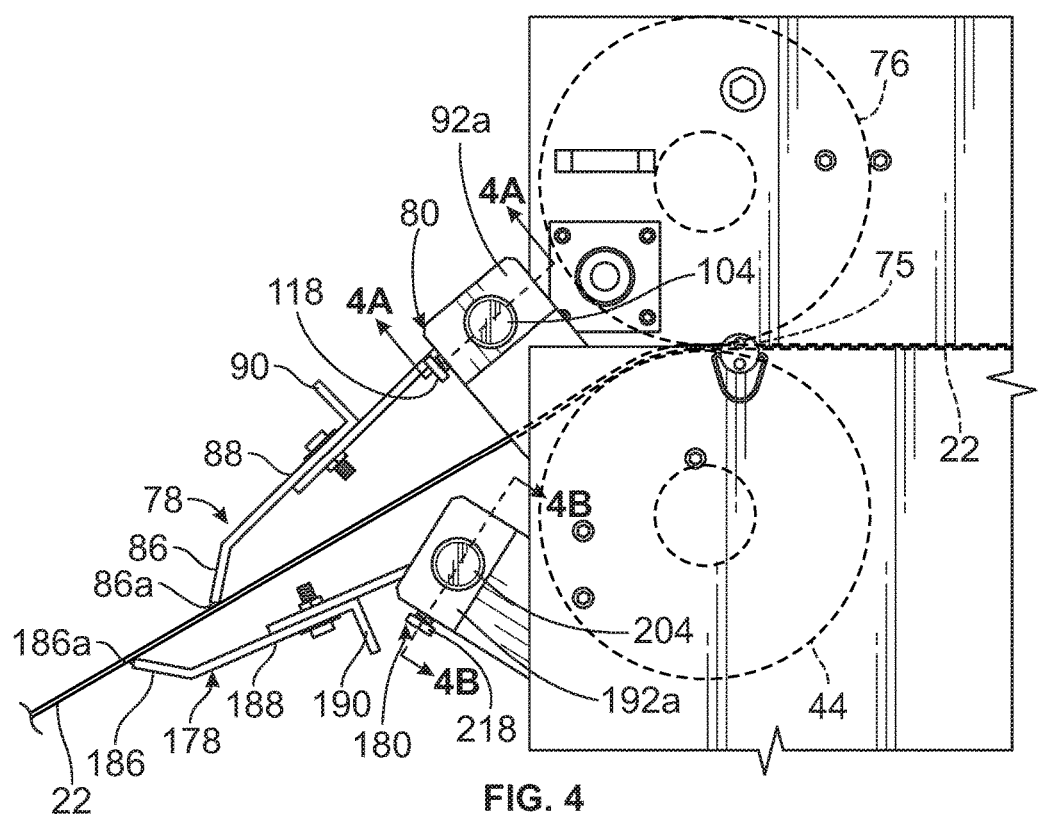
FIG. 4 depicts a partial side elevation view of the system and the airfoil apparatus, with the cover of the system shown in a closed position and with the airfoil apparatus in a first orientation.
Figure 4A:
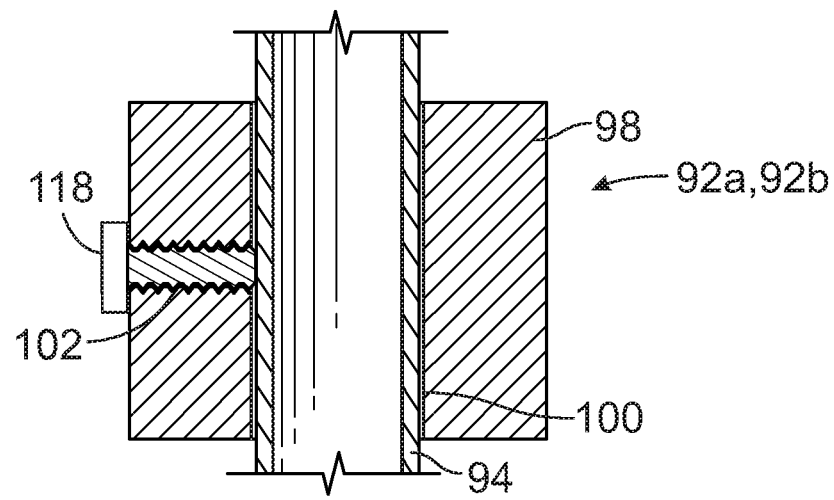
FIG. 4A depicts a cross-sectional view along line 4A-4A in FIG. 4.

As shown in FIG. 4A, each support 92a, 92b is formed of a body 98 having a first passageway 100 extending therethrough through which the rod 94 extends. A second passageway 102 is provided in the body 98 and intersects the first passageway 100. In an embodiment, the passageway 102 is perpendicular to passageway 100.

In an embodiment, the rod 94 has a knob 104 provided thereon which an operator can grasp to rotate the rod 94 relative to the supports 92a, 92b. In an embodiment, the knob 104 is provided on at least one end of the rod 94.

A fastener 118, such as a set screw, is threadedly seated within the second passageway 102 of each support 92a, 92b. An end 118a of the fastener 118 can be positioned in a first position such that the end 118a of the fastener 118 bears against the rod 94 and thereby prevents the rod 94 from rotating relative to the supports 92a, 92b, and can be positioned in a second position such that the end 118a of the fastener 118 is spaced from the rod 94 such that the rod 94 can rotate relative to the supports 92a, 92b.

As shown in FIGS. 6-9, the spacer member 96 has a front end 96a, a rear end 96b, a first side edge 96c extending between the front end 96a and the rear end 96b, a second side edge 96d extending between the front end 96a and the rear end 96b, an upper surface 96e and a lower surface 96f. In an embodiment, the side edges 96c, 96d are parallel to each other.

The spacer member 96 is attached to the rod 94 by suitable means, such as fasteners 106, adhesive or other suitable means.

In an embodiment, the spacer member 96 is attached to the second wall 88 of the upper airfoil 78 such that the upper airfoil 78 can slide relative to the spacer member 96. In an embodiment, a portion of the lower surface 88f of the second wall 88 abuts against a portion of the upper surface 98e of the spacer member 98. As shown, the spacer member 96 has a fastener 108 attached thereto and the second wall 88 of the upper airfoil 78 has an elongated slot 110 which extends along a portion of the second wall 88 between the front and rear ends 88a, 88b and from the upper surface 88e to the lower surface 88f. The fastener 108 seats within the slot 110 and can move along the length of the slot 110. The fastener 108 has an enlarged head 112 from which a shaft 114 extends, the shaft 114 extending through the slot 110. A nut 116 is threadedly engaged with the end of the shaft 114 and may abut against the upper surface 88e of the second wall 88. The nut 116 can be loosened to allow the upper airfoil 78 to move inwardly or outwardly relative to the rod 94 and thus the front wall 28 of the base cabinet 28. Once a desired position is attained, the nut 116 is engage to prevent further movement of the upper airfoil 78 relative to the rod 94. While the fastener 108 is described as being attached to the spacer member 96 and the slot 110 is described as being through the upper airfoil 78, the fastener 108 may be attached to the upper airfoil 78 and the slot 110 provided through the spacer member 96.

In an embodiment, the upper airfoil 78 is wider (from edge 88c to 88d) than the width of the spacer member (from edge 96c to 96d).

Figure 4B:
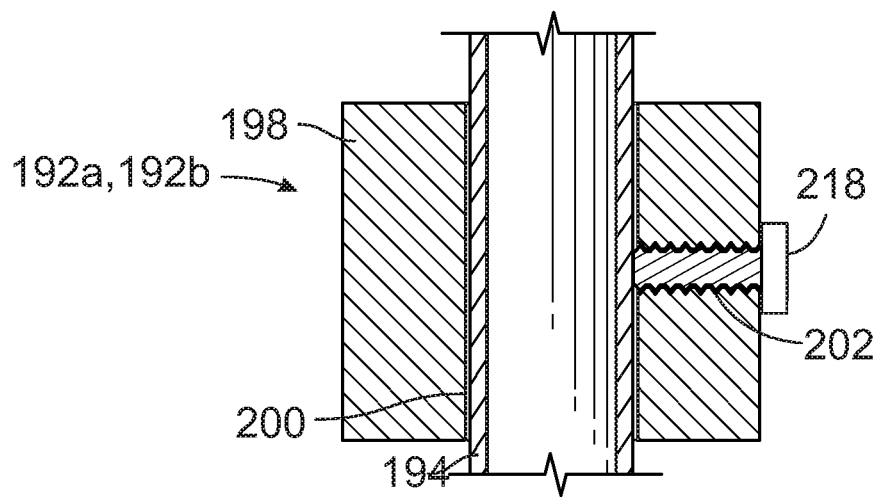
FIG. 4B depicts a cross-sectional view along line 4B-4B in FIG. 4.
Figure 5:
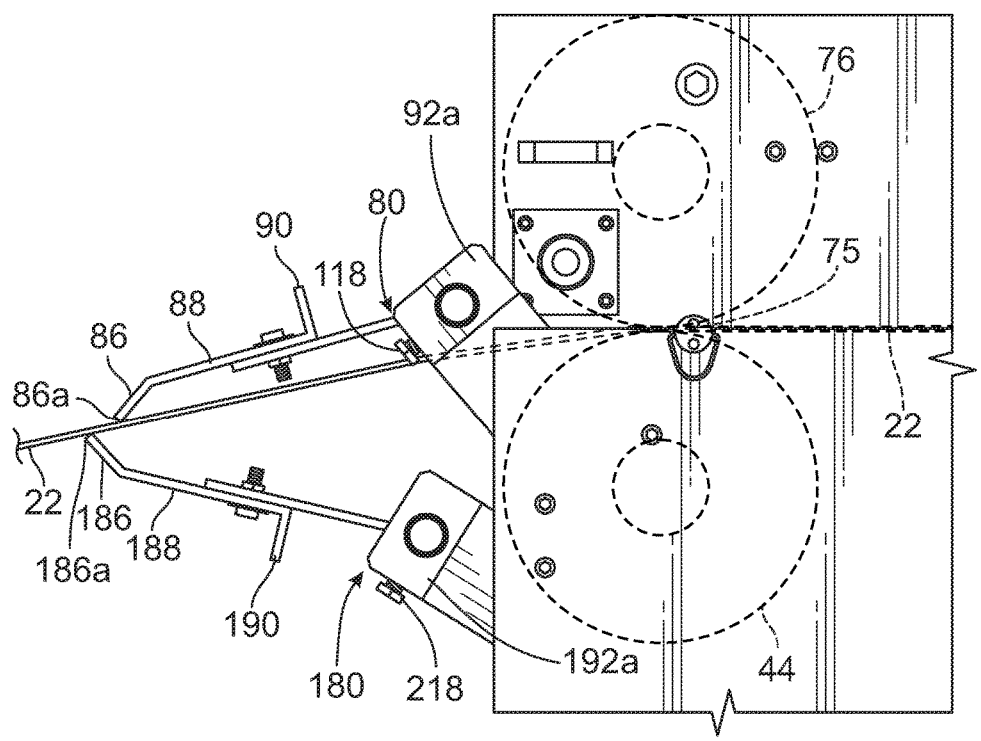
FIG. 5 depicts a partial side elevation view of the system and the airfoil apparatus, with the cover of the system shown in a closed position and with the airfoil apparatus in a second orientation.
Figure 6:
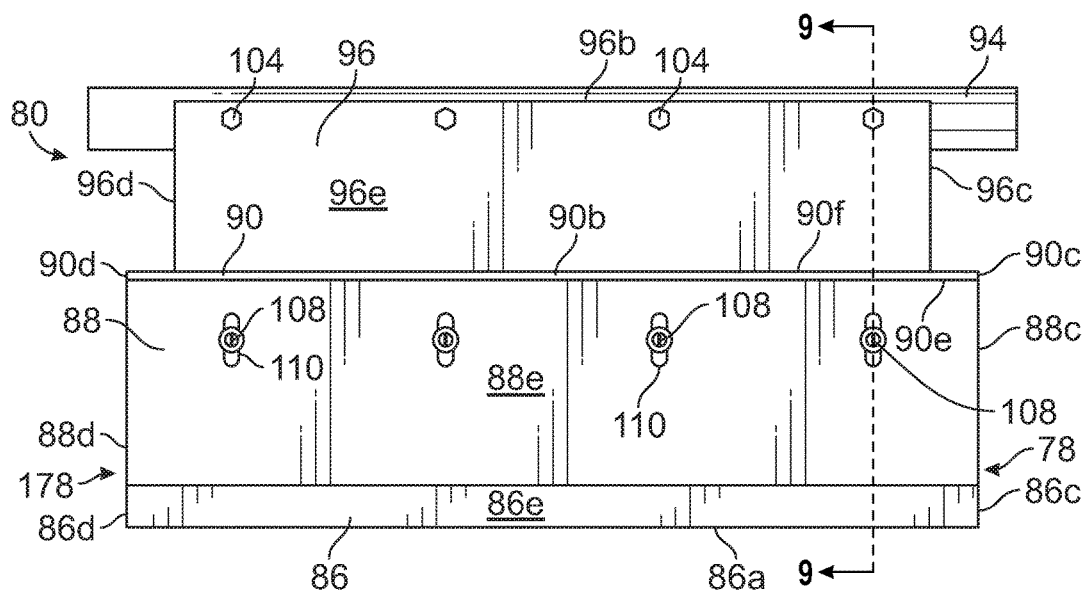
FIG. 6 depicts a top plan view of an upper airfoil of the airfoil apparatus.
Figure 7:
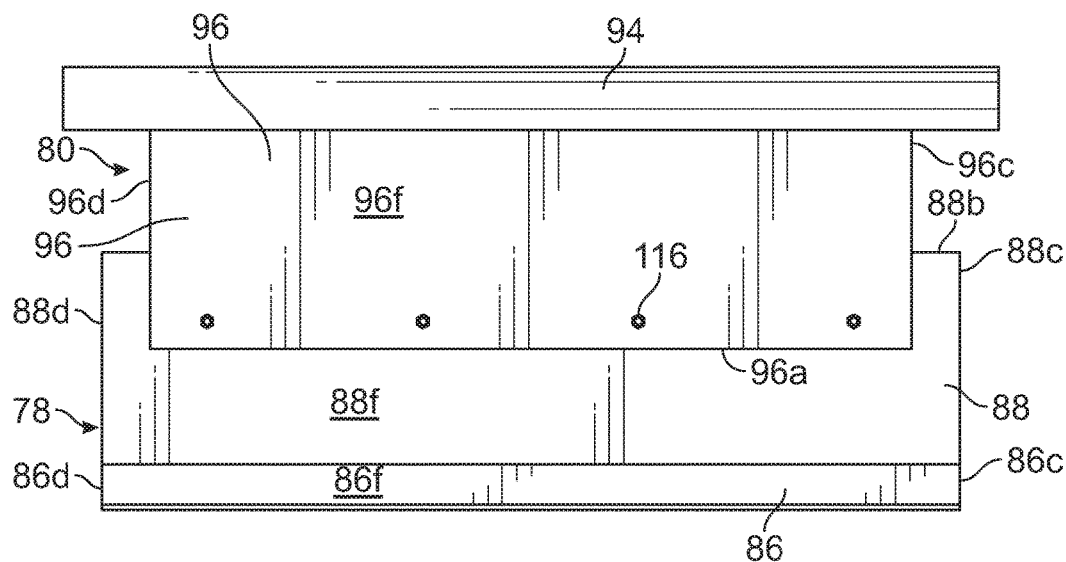
FIG. 7 depicts a bottom plan view of the upper airfoil.
Figure 8:
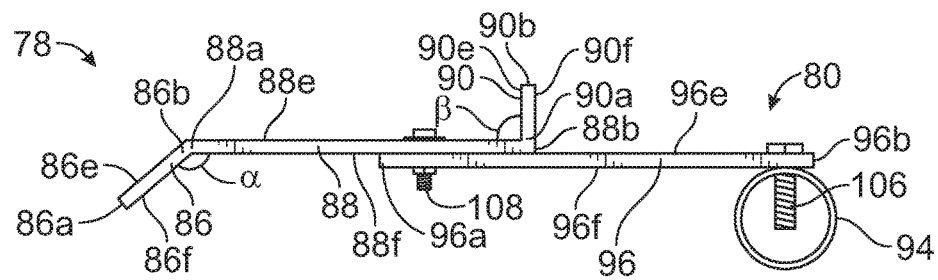
FIG. 8 depicts a side elevation view of the upper airfoil.
Figure 9:
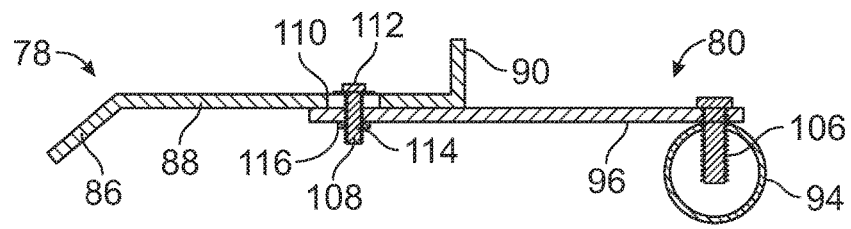
FIG. 9 depicts a cross-sectional view along line 9-9 of FIG. 6.
Figure 10:
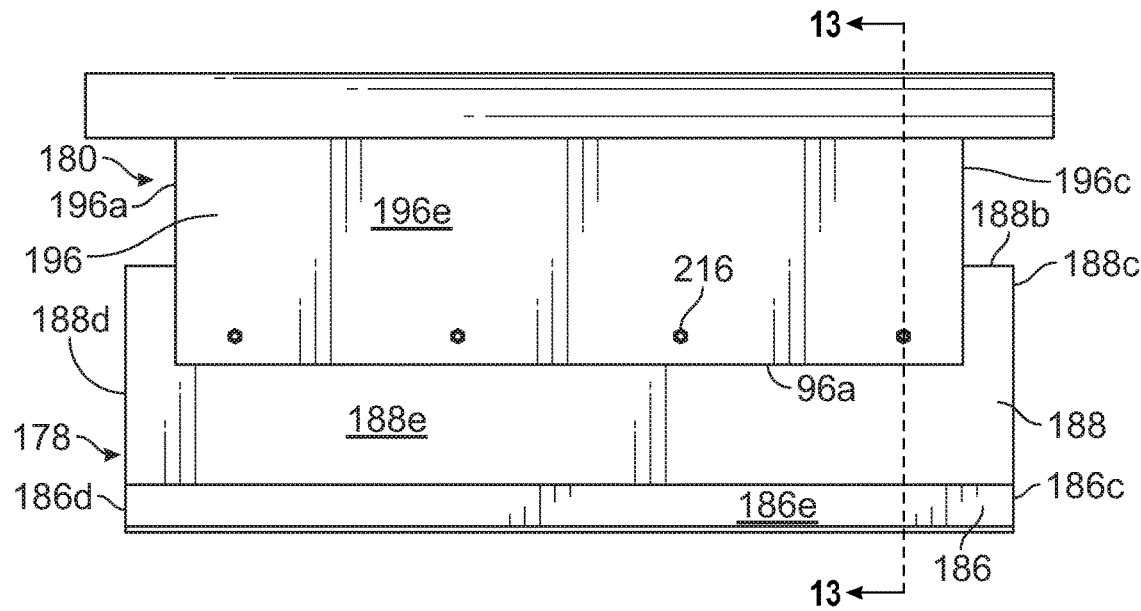
FIG. 10 depicts a top plan view of a lower airfoil of the airfoil apparatus.
Figure 11:
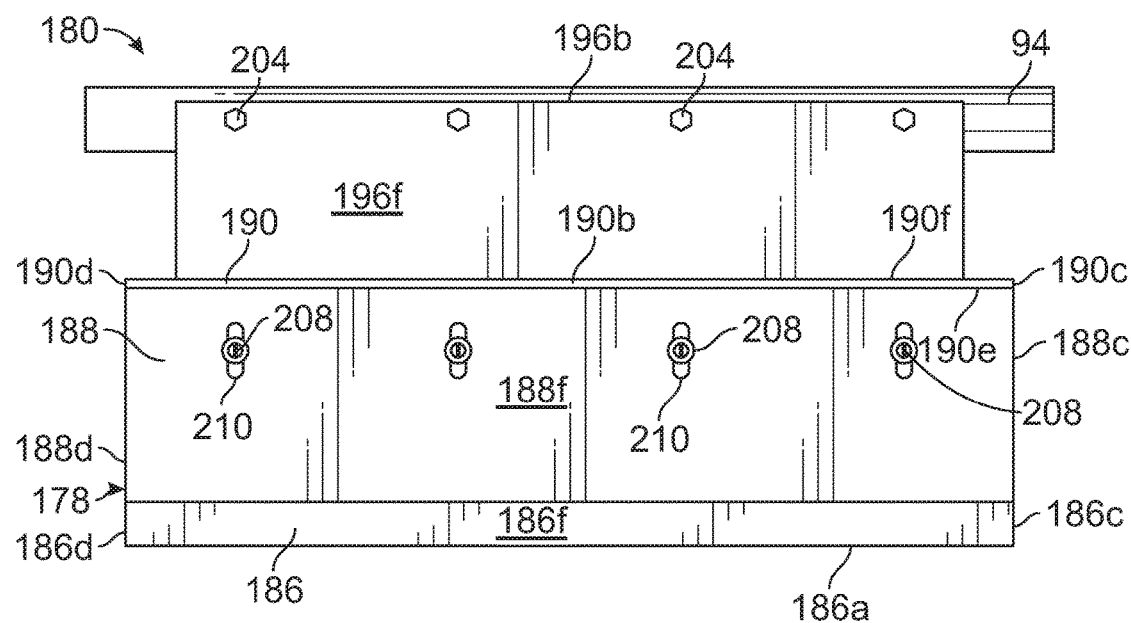
FIG. 11 depicts a bottom plan view of the lower airfoil.
Figure 12:
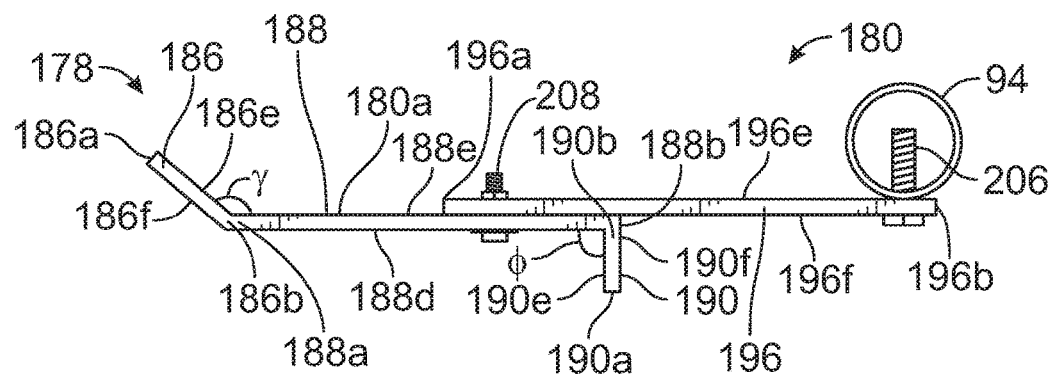
FIG. 12 depicts a side elevation view of the lower airfoil.
Figure 13:
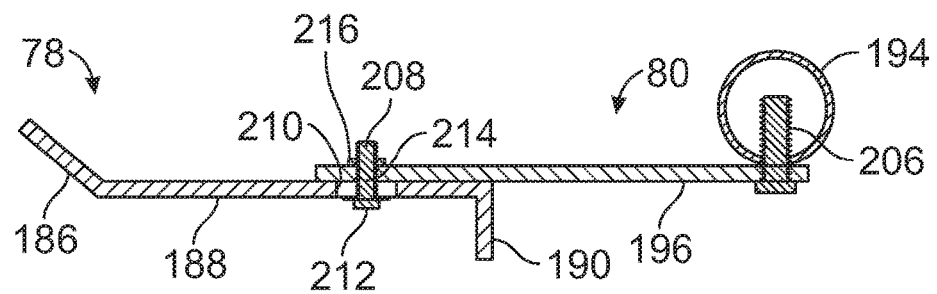
FIG. 13 depicts a cross-sectional view along line 13-13 of FIG. 10.

As shown in FIG. 4B, each support 192a, 192b is formed of a body 198 having a first passageway 200 extending therethrough through which the rod 194 extends. A second passageway 202 is provided in the body 198 and intersects the first passageway 200. In an embodiment, the passageway 202 is perpendicular to passageway 200.

In an embodiment, the rod 194 has a knob 204 provided thereon which an operator can grasp to rotate the rod 194 relative to the supports 192a, 196b. In an embodiment, the knob 204 is provided on at least one end of the rod 194.

A fastener 218, such as a set screw, is threadedly seated within the second passageway 202 of each support 192a, 192b. An end 218a of the fastener 218 can be positioned in a first position such that the end 218a of the fastener 218 bears against the rod 194 and thereby prevents the rod 194 from rotating relative to the supports 192a, 192b, and can be positioned in a second position such that the end 218a of the fastener 218 is spaced from the rod 194 such that the rod 194 can rotate relative to the supports 192a, 192b.

As shown in FIGS. 10-13, the spacer member 196 has a front end 196a, a rear end 196b, a first side edge 196c extending between the front end 196a and the rear end 196b, a second side edge 196d extending between the front end 196a and the rear end 196b, an upper surface 196e and a lower surface 196f. In an embodiment, the side edges 196c, 196d are parallel to each other.

The spacer member 196 is attached to the rod 194 by suitable means, such as fasteners 206, adhesive or other suitable means.

In an embodiment, the spacer member 196 is attached to the second wall 88 of the lower airfoil 178 such that the lower airfoil 178 can slide relative to the spacer member 196. In an embodiment, a portion of the lower surface 88f of the second wall 88 abuts against a portion of the upper surface 198e of the spacer member 198. As shown, the spacer member 196 has a fastener 208 attached thereto and the second wall 88 of the lower airfoil 178 has an elongated slot 210 which extends along a portion of the second wall 88 between the front and rear ends 88a, 88b and from the upper surface 88e to the lower surface 88f. The fastener 208 seats within the slot 210 and can move along the length of the slot 210. The fastener 208 has an enlarged head 212 from which a shaft 214 extends, the shaft 214 extending through the slot 210. A nut 216 is threadedly engaged with the end of the shaft 214 and may abut against the upper surface 88e of the second wall 88. The nut 216 can be loosened to allow the lower airfoil 178 to move inwardly or outwardly relative to the rod 194 and thus the front wall 28 of the base cabinet 28. Once a desired position is attained, the nut 216 is engage to prevent further movement of the lower airfoil 178 relative to the rod 194. While the fastener 208 is described as being attached to the spacer member 196 and the slot 210 is described as being through the lower airfoil 178, the fastener 208 may be attached to the lower airfoil 178 and the slot 210 provided through the spacer member 196.

In an embodiment, the lower airfoil 178 is wider (from edge 188c to 188d) than the width of the spacer member (from edge 1196c to 1196d).

The airfoils 78, 178 can be rotated relative to the base cabinet 26 such that front ends 86a, 186a of the airfoils 78, 178 are proximate to each other, but slightly spaced apart to create a passageway between the front ends 86a, 186a for the passage of the web 22 therebetween. The passageway is slightly larger than the thickness of the web 22.

The rods 94, 194 can be manually rotated relative to the supports 94a, 94b, 194a, 194b by loosening the appropriate fasteners 118, 218 and rotating the knobs 104, 204. To affix the rod or rods 94, 194 in the new position or positions, the fastener(s) 118, 218 is tightened to bear against the rod(s) 94, 194.

Figure 14:
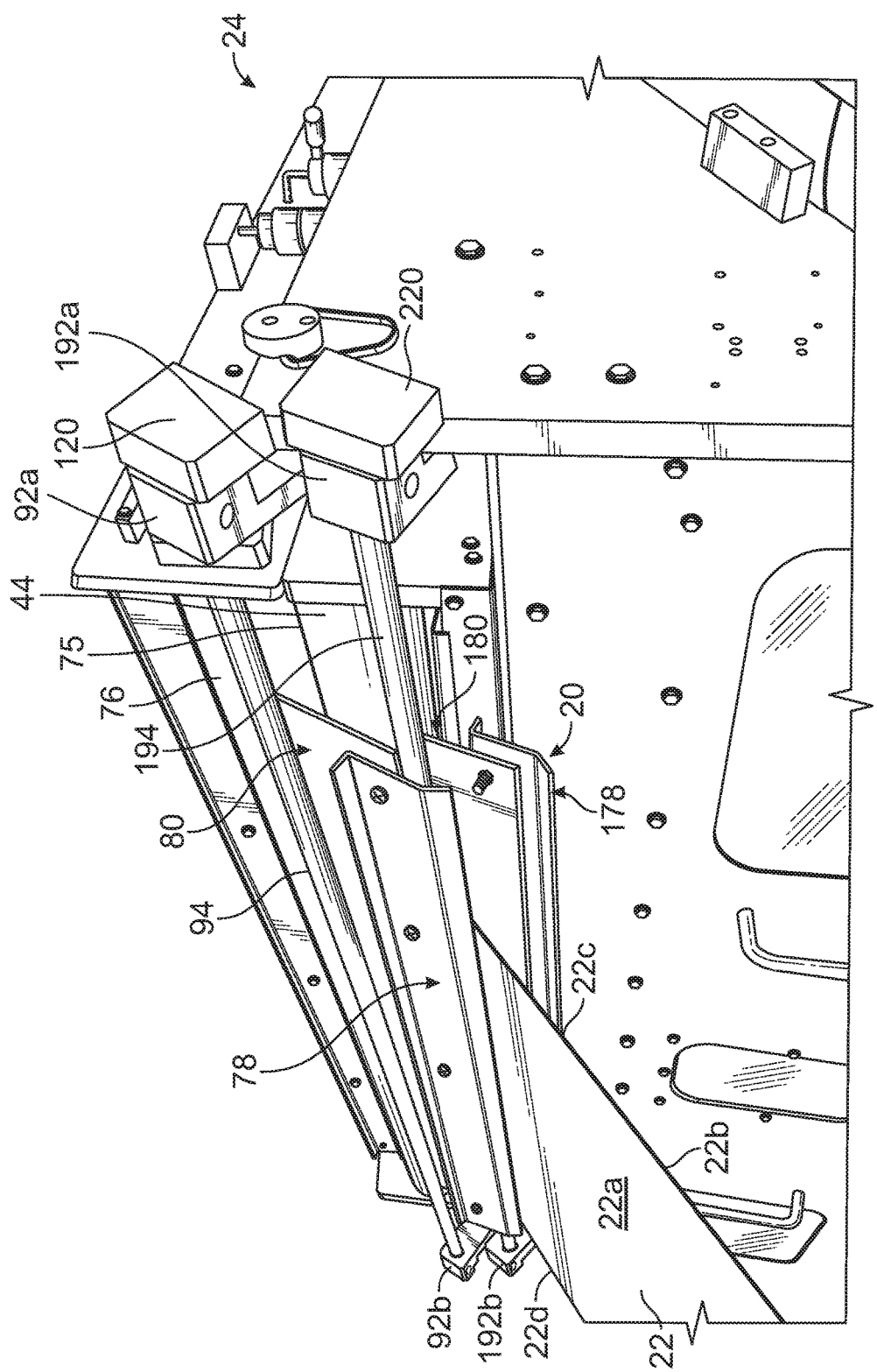
FIG. 14 depicts an enlarged perspective view of the system and a modified airfoil apparatus.

In an embodiment, the rods 94, 194 are rotated under control of motors 120, 220, see FIG. 14. The motor 120, 220 is attached to the respective rod 94, 194 and rotates the respective rod 94, 194 to a desired new position under control of the user.

In use, the cover 30 is opened and one or both of the upper and lower airfoils 78, 178 are rotated such that the front ends 86a, 186a are spread apart. The web 22 is passed between the airfoils 78, 178 and over the lower nip roller 44 and routed into the interior cavity 42 in the base cabinet 26. The cover 30 is then closed to form the nip 75 between the nip rollers 44, 76 and to form the controlled internal environment chamber 79 within the cabinet 26. One or both of the airfoils 78, 178 are rotated into position such that the front ends 86a, 186a of the airfoils are slightly spaced from the web 22, but are not touching the web 22.

The web 22 passes between the airfoils 78, 178 such that the upper surface 22a of the web 22 is proximate to the lower surfaces 86f, 88f of the upper airfoil 78 and the lower surface 22b of the web is proximate to the upper surfaces 186e, 188e of the lower airfoil 178, through the nip 75 between the nip rollers 44, 76 and into the controlled internal environment chamber 79 for treatment by the system 24. The front ends 86a, 186a of the airfoils 78, 178 are spaced apart from each other a distance which is slightly greater than the thickness of the web 22 such that the airfoils 78, 178 do not touch the web 22. In an embodiment, each front end 86a, 186a is about 1/16 of an inch away from web 22. As the high speed web 22 passes between the airfoils 78, 178, the entrained air on the surfaces 22a, 22b of the web 22 encounter the airfoils 78, 178 and is deflected by the airfoils 78, 178 and entry of the entrained air is minimized from passing through the nip 75 between the nip rollers 44, 76 and into the controlled internal environment chamber 79. When the entrained air encounters the upper airfoil 78, the entrained air flows along the upper surface 86e of the first wall 86, along the upper surface 88e of the second wall 88 and then impacts into the front surface 90a of the third wall 90. The air is then deflected outwardly from the upper airfoil 78 and away from the nip 75 between the nip rollers 44, 76. This substantially prevents this entrained air from entering into the nip 75 between the nip rollers 44, 76 and into the controlled internal environment chamber 79. When the entrained air encounters the lower airfoil 178, the entrained air flows along the lower surface 186f of the first wall 186, along the lower surface 188f of the second wall 188 and then impacts into the front surface 190a of the third wall 190. The air is then deflected outwardly from the lower airfoil 178 and away from the nip 75 between the nip rollers 44, 76. This substantially prevents this entrained air from entering into the nip 75 between the nip rollers 44, 76 and into the controlled internal environment chamber 79.

The web 22 is flexible so the web 22 may stretch or flutter. During operation, the positions of the airfoils 78, 178 can be readjusted under manual control or by use of the motors 120, 220 to adjust for this stretch or fluttering.

Figure 3:
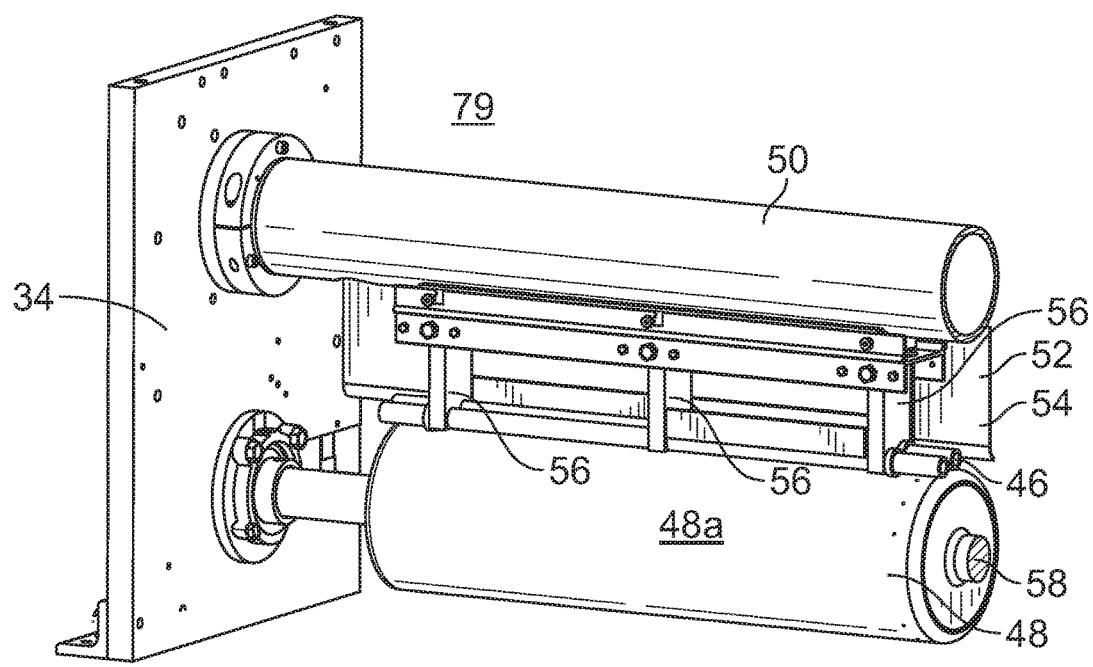
FIG. 3 depicts a perspective view of some of the working components of an example system.

In an example, the system 24 is a corona treatment system which is used to modify a surface of the web 22 to improve its ability to accept inks and adhesives. The corona treatment system may be adapted to be used in conjunction with a printing press (not shown). In a corona treatment system, as shown in FIG. 3, a high voltage electrode 46 and a cylindrical ground roller 48 are mounted within the interior cavity 42 of the base cabinet 26. A plurality of idler rollers (not shown) are provided within the base cabinet 26 to route the web 22 from between the nip rollers 44, 76 to between the electrode 46 and the ground roller 48. The electrode 46 may be a plurality of parallel electrodes; the electrode 46 may be a ceramic electrode, a FIN electrode, a segmented electrode, as is known in the art. An electrode support tube 50 is mounted between the side walls 34, 36, and an electrode magazine 52 is mounted on the electrode support tube 50 and supports the high voltage electrode 46. The electrode magazine 52 has a pair of shields 54 (only one of which is shown) which are connected to the electrode support tube 50, and support tubes 56 for supporting the electrode 46 between the shields 54. As such, the shields 54 aid in guiding the ozone to be vented through the electrode support tube 50 in a known manner. The ground roller 48 is rotatably on a shaft 58 mounted between the side walls 34, 36 and is positioned beneath the electrode support tube 50 and beneath the electrode 46 in spaced relationship from the electrode 46. Ground rollers used in corona treatment systems are known in the art. The ground roller 48 may have a surface 48a formed of steel, ceramic, rubber, etc. The ground roller 48 may be formed of a self-supporting tube of a rigid dielectric material, such as a glass fiber reinforced epoxy or a glass fiber reinforced polymeric polyester. A conductive layer may be bonded to an inner wall part of the ground roller 48. The conductive layer is a relatively thin conductive metallic film or a coating containing a conductor, such as graphite. The conductive layer is relatively thin and does not have to be self-supporting because it is supported by the inner wall part of the roller. The electrode 46 may span the length of the ground roller 48. The ground roller 48 and the electrode 46 may be spaced 1.5 mm away from each other to form an air gap through which the web 22 is routed. The base cabinet 26 further includes a power supply housing 60 attached to one of the side walls, shown as side wall 32, in FIG. 1. The power supply housing 60 has a control panel 62 and includes the controls for operating the corona treatment system. The power supply housing 60 also includes a power supply and a high voltage transformer provided with a high voltage wire. The wire terminates in a high voltage connection normally enclosed by a high voltage cover plate located behind the side wall 34. The high voltage connection establishes a high voltage field between the electrode 46 and the ground roller 48 with the web 22 to be treated interposed between the electrode 46 and the ground roller 48. As is well known, the high voltage field establishes a corona discharge that causes the chemical composition of the material of the web 22 to be modified which, in turn, improves selected characteristics of the material of the web 22 such as wettability so that printed matter or coating may be more advantageously adhered thereto. Within the controlled internal environment chamber 79, the web 22 is guided by idler rollers (not shown) such that the web 22 is wound about the ground roller 48 in spaced relationship from the electrode 46. The ground roller 48 supports the web 22 which is treated as it passes through the air gap between the ground roller 48 and the electrode 46 in a direction transverse to the longitudinal direction of the electrode 46. During treatment, the web 22 is passed between the ground roller 48 and the electrode 46 during which the material of web 22 is treated to modify the material. A corona discharge develops in the air gap when the electrode 46 is energized by the power supply to create a high voltage. The surface of the web 22 passing through the air gap is modified by the exposure to the corona so that its printing properties are improved.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While various embodiments of the invention have been described, it will be apparent to those of ordinary skill in the art that other embodiments and implementations are possible within the scope of the invention. Accordingly, the invention is not to be restricted except in light of the attached claims and their equivalents.

The invention claimed is:

1. An assembly comprising:
a system having a controlled interior environment comprising a cabinet defining an internal chamber, upper and lower nip rollers mounted on the cabinet and forming a nip through which a web of material can pass; and
an airfoil assembly comprising an upper airfoil cantilevered from the cabinet, the upper airfoil comprising a first wall and a second wall, the first wall having a rear end, a forward end, an upper surface and a lower surface, the rear end of the first wall being attached to the cabinet proximate to the upper nip roller such that the forward end is spaced from the cabinet, the second wall having a top end, a forward surface and a rearward surface, the second wall extending upwardly from the upper surface of the first wall and at an angle relative to the first wall, a lower airfoil cantilevered from the cabinet, the lower airfoil comprising a first wall and a second wall, the first wall of the lower airfoil having a rear end, a forward end, an upper surface and a lower surface, the rear end of the first wall of the lower airfoil attached to the cabinet proximate to the lower nip roller such that the forward end of the lower airfoil is spaced from the cabinet, the second wall of the lower airfoil having a top end, a forward surface and a rearward surface, the second wall of the lower airfoil extending downwardly from the lower surface of the first wall of the lower airfoil and at an angle relative to the first wall of the lower airfoil.

2. The assembly of claim 1, wherein the upper airfoil is rotatably mounted to the cabinet such that the forward end of the upper airfoil can be moved toward or away from the forward end of the lower airfoil.

3. The assembly of claim 1, wherein the lower airfoil is rotatably mounted to the cabinet such that the forward end of the lower airfoil can be moved toward or away from the forward end of the upper airfoil.

4. The assembly of claim 1, wherein the upper and lower airfoils are rotatably mounted to the cabinet such that the forward ends of the airfoils can be moved toward or away from each other.

5. The assembly of claim 1, wherein the first wall of the upper airfoil is angled relative to the second wall of the upper airfoil at an angle of 90 degrees.

6. The assembly of claim 1, wherein the first wall of the lower airfoil is angled relative to the second wall of the lower airfoil at an angle of 90 degrees.

7. The assembly of claim 1, wherein the first wall of the upper airfoil is angled relative to the second wall of the upper airfoil at an angle of 90 degrees and the first wall of the lower airfoil is angled relative to the second wall of the lower airfoil at an angle of 90 degrees.

8. The assembly of claim 1, wherein the upper airfoil is attached to the cabinet by a rod which is rotatably mounted to the cabinet.

9. The assembly of claim 8, further comprising a knob attached to the rod, wherein upon rotation of the knob, the upper airfoil is rotated.

10. The assembly of claim 8, further comprising a motor attached to the upper airfoil, the motor being configured to rotate the upper airfoil.

11. The assembly of claim 1, wherein the lower airfoil is attached to the cabinet by a rod which is rotatably mounted to the cabinet.

12. The assembly of claim 11, further comprising a knob attached to the rod, wherein upon rotation of the knob, the lower airfoil is rotated.

13. The assembly of claim 11, further comprising a motor attached to the upper airfoil, the motor being configured to rotate the upper airfoil.

14. The assembly of claim 1, wherein the upper airfoil is attached to the cabinet by a rod which is rotatably mounted to the cabinet, and the lower airfoil is attached to the cabinet by a rod which is rotatably mounted to the cabinet.

15. The assembly of claim 14, further comprising a knob attached to each rod, wherein upon rotation of the knob, the airfoil is rotated.

16. The assembly of claim 14, further comprising a motor attached to the upper airfoil, the motor being configured to rotate the upper airfoil.

17. The assembly of claim 1, further comprising a spacer member attached to the upper airfoil, the spacer member having a rear end, a forward end, an upper surface and a lower surface, and a rod attached to the spacer member, the rod being rotatable relative to the cabinet to rotate the upper airfoil and the spacer member, wherein surfaces of the spacer member and the upper airfoil overlap, wherein one of the upper airfoil and the spacer member has a plurality of elongated slots therethrough, each slot having a length, and the other of the upper airfoil and the spacer member has a plurality of fasteners attached thereto, wherein the respective fasteners are mounted in respective slots, the fasteners being configured to move along the length of the slots to move the upper airfoil relative to the spacer member.

18. The assembly of claim 1, further comprising a spacer member attached to the lower airfoil, the spacer member having a rear end, a forward end, an upper surface and a lower surface, and a rod attached to the spacer member, the rod being rotatable relative to the cabinet to rotate the lower airfoil and the spacer member, wherein surfaces of the spacer member and the lower airfoil overlap, wherein one of the lower airfoil and the spacer member has a plurality of elongated slots therethrough, each slot having a length, and the other of the lower airfoil and the spacer member has a plurality of fasteners attached thereto, wherein the respective fasteners are mounted in respective slots, the fasteners being configured to move along the length of the slots to move the lower airfoil relative to the spacer member.

19. The assembly of claim 1, further comprising an upper spacer member attached to the upper airfoil, the upper spacer member having a rear end, a forward end, an upper surface and a lower surface, and a upper rod attached to the upper spacer member, the upper rod being rotatable relative to the cabinet to rotate the upper airfoil and the upper spacer member, wherein surfaces of the upper spacer member and the upper airfoil overlap, wherein one of the upper airfoil and the upper spacer member has a plurality of elongated slots therethrough, each slot having a length, and the other of the upper airfoil and the upper spacer member has a plurality of fasteners attached thereto, wherein the respective fasteners are mounted in respective slots, the fasteners being configured to move along the length of the slots to move the upper airfoil relative to the upper spacer member, and a lower spacer member attached to the lower airfoil, the lower spacer member having a rear end, a forward end, an upper surface and a lower surface, and a lower rod attached to the lower spacer member, the lower rod being rotatable relative to the cabinet to rotate the lower airfoil and the lower spacer member, wherein surfaces of the lower spacer member and the lower airfoil overlap, wherein one of the lower airfoil and the lower spacer member has a plurality of elongated slots therethrough, each slot in the one of the lower airfoil and the lower spacer member having a length, and the other of the lower airfoil and the lower spacer member has a plurality of fasteners attached thereto, wherein the respective fasteners in the one of the lower airfoil and the lower spacer member are mounted in respective slots, the fasteners in the one of the lower airfoil and the lower spacer member being configured to move along the length of the slots in the one of the lower airfoil and the lower spacer member to move the lower airfoil relative to the lower spacer member.

\* \* \* \* \*